Patented Feb. 19, 1935

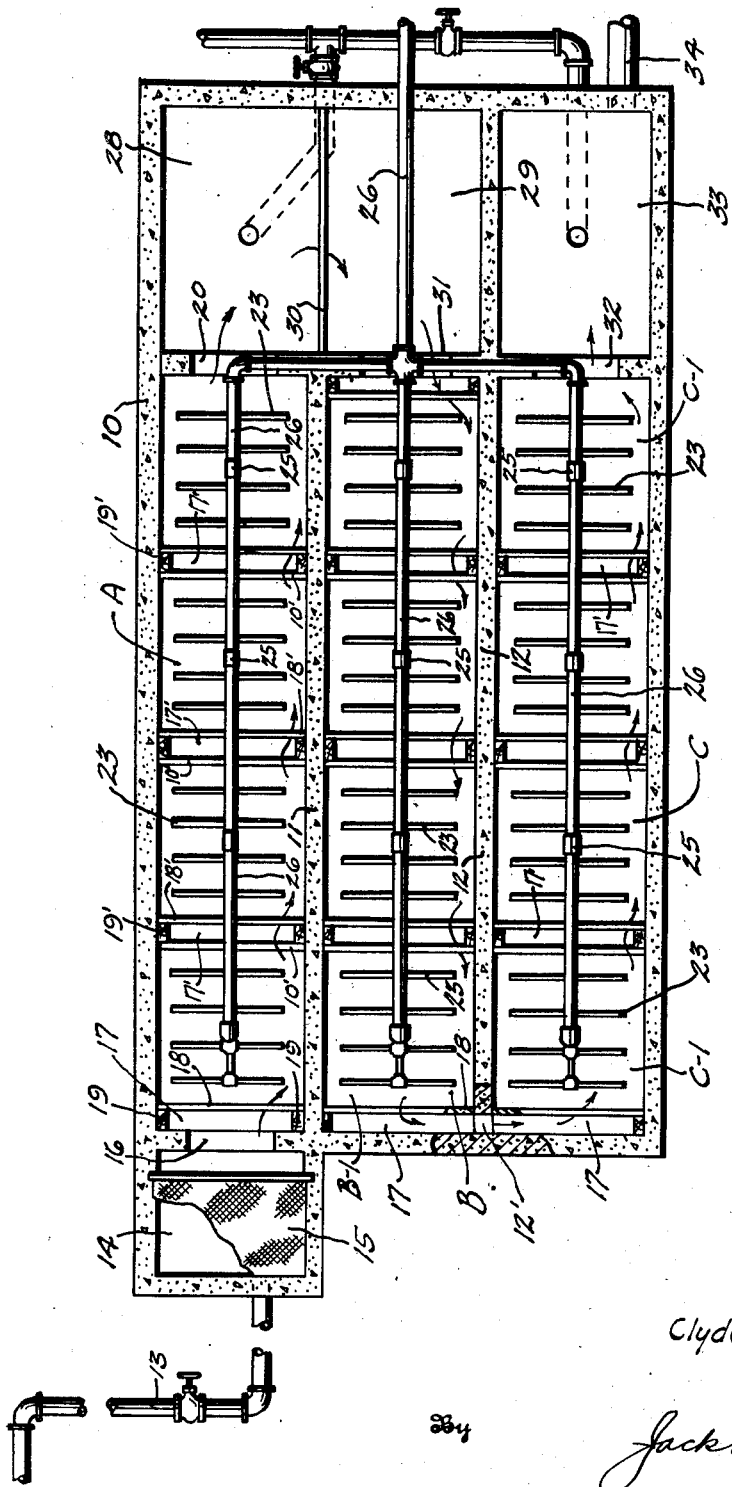

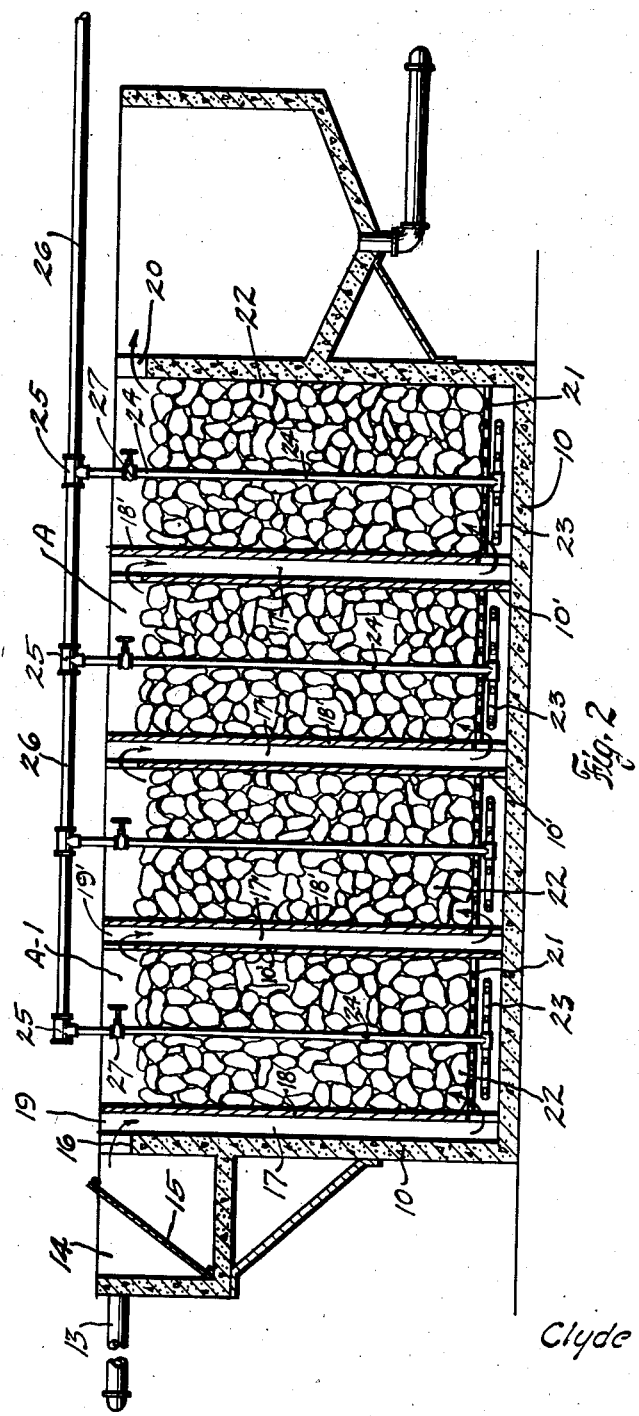

1,991,896

UNITED STATES PATENT OFFICE 1,991,896

SEWAGE TREATING PROCESS

Clyde C. Hays, Waco, Tex.

Application October 15, 1931, Serial No. 568,939

4 Claims. (Cl. 210—8)

This invention relates to new and useful improvements in sewage treating processes.

One object of the invention is to provide improved means and steps for nitrifying the organic substances in sewage, thereby reducing them to simple salts and coagulating and precipitating the remaining solids in a moss of biological active sludge.

Another object of the invention is to provide for a circuitous and baffled flow of the sewage or industrial waste by first passing the sewage downwardly to the bottom of a tank and thence upwardly through a compartment containing obstructions such as stones or rocks and various types of biological organisms for setting up the subsequent stages of chemical reactions necessary in the purification and clarification of the sewage or other waste; and repeating this downward and upward flow successively through the tank.

A further object of the invention is to conduct the sewage from the compartments of the tank to a settling basin and there settle out the coagulated solids which result from the sewage passing between the stones or rocks upon which has been formed a slime growth of organisms which coagulate the organic substances in the sewage.

Still another object of the invention is to again pass the liquid or sewage from the settling basin back through a separate set of compartments either in the same tank as the first set of compartments or in a separate tank, whereby it is brought into contact with a biological growth upon the rocks or stones which nitrifies the nitrogen solution and reduces it to a stable nitrate content and then flowing the liquid to another settling basin, whereby the remaining solids are settled out and a clear and stabilized effluent is discharged from said basin.

A construction designed to carry out the invention will be hereinafter described together with other features of the invention.

The invention will be more readily understood from a reading of the following specification and by reference to the accompanying drawings in which an example of the invention is shown, and wherein:

Figure 1 is a plan view of a structure for carrying out the process, and

Figure 2 is a longitudinal vertical sectional view of the same.

In the drawings the numeral 10 designates a rectangular tank structure which is divided by longitudinal vertical partitions 11 and 12 into tanks A, B and C, it being understood that these tanks could be separately constructed if desired. The influent, which may be sewage or industrial waste, is fed from a pipe 13 into a receiving box or chamber 14 having an inclined screen 15 therein through which the influent must pass. The purpose of this screen is to remove grit and other extraneous matter, which may be from time to time taken out of the box.

A liquid level is maintained in the box 14 and the sewage or fluid passes through a weir 16 into a vertical channel 17 formed between the end wall and a transverse vertical baffle 18. The channel is comparatively narrow longitudinally of the tank A, but is wide transversely of said tank. The baffle is secured to uprights 19 at each end suitably fastened to the side walls of the tank A. The baffle terminates short of the bottom of the tank so as to permit the sewage to flow into the first chamber A—1 of the tank.

By provision of the narrow channel 17 the sewage is rapidly and directly carried to the bottom of the compartment. Similar channels 17' separate or divide the tank into a plurality of compartments A—1. It is to be understood that any number of compartments may be used. The channels 17' are formed by baffles 10' corresponding to the end wall of the tank and baffles 18' corresponding to the baffle 18, said baffles being secured to studs 19'. The baffles 10' terminate short of the top of the tank and approximately on a level with the bottom of the weir 16, while the baffles 18' extend from the top of the tank and terminate short of the bottom thereof. At the opposite end of the tank an overflow weir 20 is provided in the end wall and the passage or flow of the fluid is clearly indicated in Figures 1 and 2 by arrows. It is pointed out that the fluid flows downwardly in each channel and upwardly in each compartment.

Each compartment A—1 has a metal grille or grate 21 near its bottom and preferably opposite the entrance from the fluid channel. This grate may be of any suitable structure but must be sufficiently open to permit a free passage of the fluids and also air. The compartment above the grate is filled with stones, rocks or other mineral aggregate and these may vary in size according to the character of the sewage or waste being treated. In some instances stones averaging two inches in diameter are most satisfactory, where in other instances larger or smaller stones have been successfully used, and it is to be expressly understood that the dimension given is merely by way of illustration and not one of limitation.

Below each grate 21 is mounted an air nozzle 23 of any suitable structure, but preferably made as illustrated in the drawings, so as to supply jets of air under the entire mass of stones. Each nozzle is suspended from a supply pipe 24 extending down through the center of the compartment from a T 25 connected in a manifold 26 to which air under pressure is suitably supplied. Each pipe 24 includes a cut-off valve 27 above the fluid level therein. It will be seen that the air under pressure, being delivered under the mass of stones or rocks in each compartment, will flow upwardly around and between said stones, thus aerating the upwardly flowing fluid and the compartment. A biological slime coating forms on the surfaces of the stones, as will be hereinafter explained.

The fluid from the last compartment of the tank A overflows through the weir 20 into a settling basin 28. When the influent or sewage has passed through the compartments A—1 of the tank A it will have been treated sufficiently as to be ready for the first settling step. In this basin the sewage is sufficiently arrested in its travel as to cause the majority of the coagulated solids to settle out. The basin 28 is separated from a similar basin 29 by a transverse vertical partition 30, which terminates a substantial distance above the bottom of the basins, thus permitting the liquid to flow from the basin 28 under the partition and into the basin 29.

The end wall of the tank B is provided with a weir 31 substantially on a level with the weir 20 and the liquid or sewage will flow from the basin 29 through the weir 31 into the channel 17 of the tank B and thence through its compartments B—1, which are of the same construction as the compartments A—1 and are likewise filled with stones 22.

At the opposite end of the tank B the partition wall 12 is provided with an opening 12' at its bottom connecting the bottom of the channel 17 of the last compartment B—1 with the channel 17 of the first compartment C—1 of the tank C. By this arrangement the sewage continues its proper sequence in flowing through the compartments and is finally discharged through a weir 32 into a settling basin 33, from which the clarified liquid is conducted through a pipe 34. When the liquid passes through the compartments B—1 and C—1, a dark brown biological growth is produced on the stones 22 and this growth nitrifies the nitrogen in solution and reduces it to a stable nitrate content. The coagulated and nitrified liquid then passes to the basin 33 where the remaining solids are settled out.

As the sewage is passed through the various tanks and its compartments, it is aerated by the air currents discharging from the nozzles 23 and passing upwardly between the stones 22 with the sewage. This is very important because it furnishes a supply of oxygen for the biological organisms which adhere to and grow on the surfaces of the stones. These biological organisms form an activated slime coating on each stone and this coating nitrifies the organic substances in the sewage, thereby reducing them to simple salts, while the remaining solids coagulate and precipitate in a moss of biological active sludge on the surfaces of the stones.

It is obvious that the types of biological organisms forming the activated slime coating on the stones are different in each of the successive chambers, as certain types of organic matters are attacked and decomposed before other types of organic matters are affected, the result being that the various types of biological organisms necessary to set up the different stages of purification are formed and grow in the successive chambers.

It is understood that the invention is not to be limited to the use of gravel or stones, as any other equivalent material may be used, nor is it to be limited to the particular structure illustrated. The intermediate settling out of the solids is very important because it hastens the clarifying of the liquid and enhances the growth of the various types of organisms. The unobstructed downward passage of the liquid and its aeration while it is passing upwardly through the stones is a very important step in the method, as it prevents retardation and promotes a more rapid and effective clarification.

Having illustrated and described a preferred form of the invention, what I claim, is:

1. The process of treating sewage which consists, in passing the sewage through a mineral aggregate, continuously aerating under pressure the aggregate while the sewage is flowing therethrough to supply oxygen to the biological organisms which adhere to the surfaces of the aggregate and whereby slime coatings are formed on the surfaces of the aggregate, thus coagulating the larger part of the organic substances in suspension, then conducting the sewage to a settling basin and settling out the coagulated solids, and then further conducting the partially clarified sewage through mineral aggregates and aerating the aggregates while the sewage is flowing therethrough to supply oxygen to further biological organisms and produce slime coatings on the aggregates to further coagulate the organic substances and to nitrify the organic nitrogen and reduce it to a simple nitrate.

2. The process of treating sewage which consists, in alternately passing the sewage downwardly in unrestricted channels and upwardly through beds of mineral aggregate, and continuously aerating the aggregate and the sewage while the latter is flowing upwardly to supply oxygen to promote biological growths on the surfaces of the aggregate and to coagulate the organic substances in suspension in the sewage, then settling out the solids, then continuing the passage of the partially clarified sewage by alternately passing it downwardly through unrestricted channels and upwardly through beds of mineral aggregate and at the same time aerating the aggregate to promote biological growths, and then settling out the solids and carrying off the clarified liquid.

3. The process of treating sewage, which consists of passing the sewage through a mineral aggregate continuously aerating under pressure the aggregate while the sewage is flowing therethrough to supply oxygen to the biological organisms which adhere to the surfaces of the aggregate and whereby slime coatings are formed on the surfaces of the aggregate, thus coagulating the larger part of the organic substances in suspension, then conducting the sewage to a settling basin and settling out the coagulated solids, this being the first and initial step in the process, then further conducting the clarified sewage through mineral aggregates and aerating the aggregates while the sewage is flowing therethrough to supply oxygen to further the growth of the biological organisms, and produce coatings of the organisms on the aggregates, which oxides the colloids and organic substances, and nitrifies the organic nitrogen and reduces it to a simple nitrate, this being the second stage in the process.

4. The process of treating sewage which consists in alternately passing the sewage downwardly in unrestricted channels and upwardly through beds of mineral aggregate, and continuously aerating the aggregate and the sewage while the latter is flowing upwardly to supply oxygen to promote biological growths on the surfaces of the aggregate and to coagulate the organic substances in suspension in the sewage, then settling out the solids, then continuing the passage of the clarified sewage by alternately passing it downwardly through unrestricted channels and upwardly through beds of mineral aggregate, and at the same time aerating the aggregate to promote biological growths, and then settling out the solids and carrying off the clarified liquid.

CLYDE C. HAYS.